US005515120A

United States Patent [19]

[11] Patent Number: 5,515,120

[45] Date of Patent: May 7, 1996

Burillo Gilmartin

[54] CONTINUOUS SLIDE PROJECTOR

[75] Inventor: Fernando Burillo Gilmartin, Madrid, Spain

[73] Assignee: Imagen Viva, S.L., Madrid, Spain

[21] Appl. No.: 162,089

[22] PCT Filed: Apr. 12, 1993

[86] PCT No.: PCT/ES93/00027

§ 371 Date: Dec. 10, 1993

§ 102(e) Date: Dec. 10, 1993

[87] PCT Pub. No.: WO93/21622

PCT Pub. Date: Oct. 28, 1993

[30] Foreign Application Priority Data

Apr. 13, 1992 [ES] Spain .................................... 9200800

[51] Int. Cl.[6] .................................................. G03B 21/00

[52] U.S. Cl. ......................................... 353/74; 353/DIG. 2

[58] Field of Search .............................. 353/DIG. 2, 108, 353/109, 28, 29, 72, 74, 79, 30

[56] References Cited

U.S. PATENT DOCUMENTS 1,452,797 4/1923 Dudley .............................. 353/DIG. 2
4,351,591 9/1982 Stockett ............................ 353/DIG. 2
4,390,257 6/1983 Fernekes et al. .................. 353/DIG. 2
4,942,411 7/1990 Polston ............................. 353/DIG. 2
5,223,868 6/1993 Coiner, II .................................. 353/13

FOREIGN PATENT DOCUMENTS 555025 6/1923 France .
3242409 5/1984 Germany .
3639660 7/1987 Germany .
8900395 6/1989 Germany .
111672 5/1924 Switzerland .

*Primary Examiner*—William A. Cuchlinski, Jr.
*Assistant Examiner*—William C. Dowling
*Attorney, Agent, or Firm*—Peter L. Michaelson; Jeffery J. Brosemer

[57] ABSTRACT

A continuous slide projector constructed of a box housing having a semi-transparent mirror pivotally attached to an open front frame. A light source is mounted within the housing for illuminating a transparent slide strip positioned between the light source and the semi-transparent mirror. The slide strip is coaxially rolled upon two spools, each having a drive means, so that when the spools are rotated the slide strip moves in unison with the spools. A second light source is mounted on the housing above the semi-transparent mirror such that a person in front of the housing will produce an illuminated image of himself in the mirror upon energizing the second light source.

3 Claims, 1 Drawing Sheet

CONTINUOUS SLIDE PROJECTOR

The object of this Invention Patent is a continuous slide projector which has considerable advantages and innovations compared with different projectors used for the same or similar purposes up to present.

More specifically, the invention conceived is a projector set, with a screen which is a mirror the user may look at himself in.

At present, and with reference to the state of present techniques, it is worth mentioning the existence of slide projectors which consist of a projector and a screen that is independent of the former, on which the slides are projected.

There are various disadvantages to these types of projectors, among which there is partial or total interruption of the slide when someone or something intercepts the ray of light emitted by the projector toward the screen, or the unaesthetic appearance of the screen when not in use.

In order to avoid such disadvantages, a continuous slide projector has been conceived, the object of this patent, which in a preferential functioning mode, without this being limiting, works through a parallel base housing, the front side of which has a screen that acts as a screen for projection, as well as being a mirror in which the user may look at himself.

At the front of the projector, located immediately above the screen, there is an illumination set, equipped with the corresponding lamp, which is duly covered. Once this lighting set is activated, it allows the front surface of the screen to act as a mirror, which the user may see himself in.

Likewise, there is a projection set placed inside the housing, which may be of the incandescent lamp type, properly placed before a succession of slides laid out on a carriage that places them in the ray of light given off by the projector light, so they are projected on the screen included in the set. Said movement may be driven by an electric motor built into the device the projection is to be housed in.

Likewise, the projector housing shall bear several control buttons to independently activate the set in mirror or slide projector mode.

In order to achieve a more detailed description of the invention, this shall refer to the attached figures in which, for example, without this being limiting at all, the preferred form of construction has been described.

In the drawings:

FIG. 1 shows a continuous slide projector of the type described, which fundamentally consists of a slide, projector, screen and a carriage to feed slides in continuously.

The slide strip is a continuous band -1- with the printed images which are to be shown on the successive step forward of the transparent strip.

The projector set consists of a mirror -2-, side walls -3- and a light box, which has a reflective screen at the rear -4-, a first source of light -5- which in the example is formed by two fluorescent tubes, a second source of light -18-, and the electronic starter -6- for the light sources.

The drive mechanism for the images consists of a frame consisting of a body -7-, two spools -8-, one at each end of the frame, which roll the transparent film -1-, each one at one of its ends, two motor reducers -9-, one for each spool; two rollers to support the transparent strip and a set of side rollers -10- to guide the strip; and an electronic control set which will be described hereunder, and the user may start and stop the projector using switch -11-, as well as by manual control of the images using selector -12-.

Figure 1:
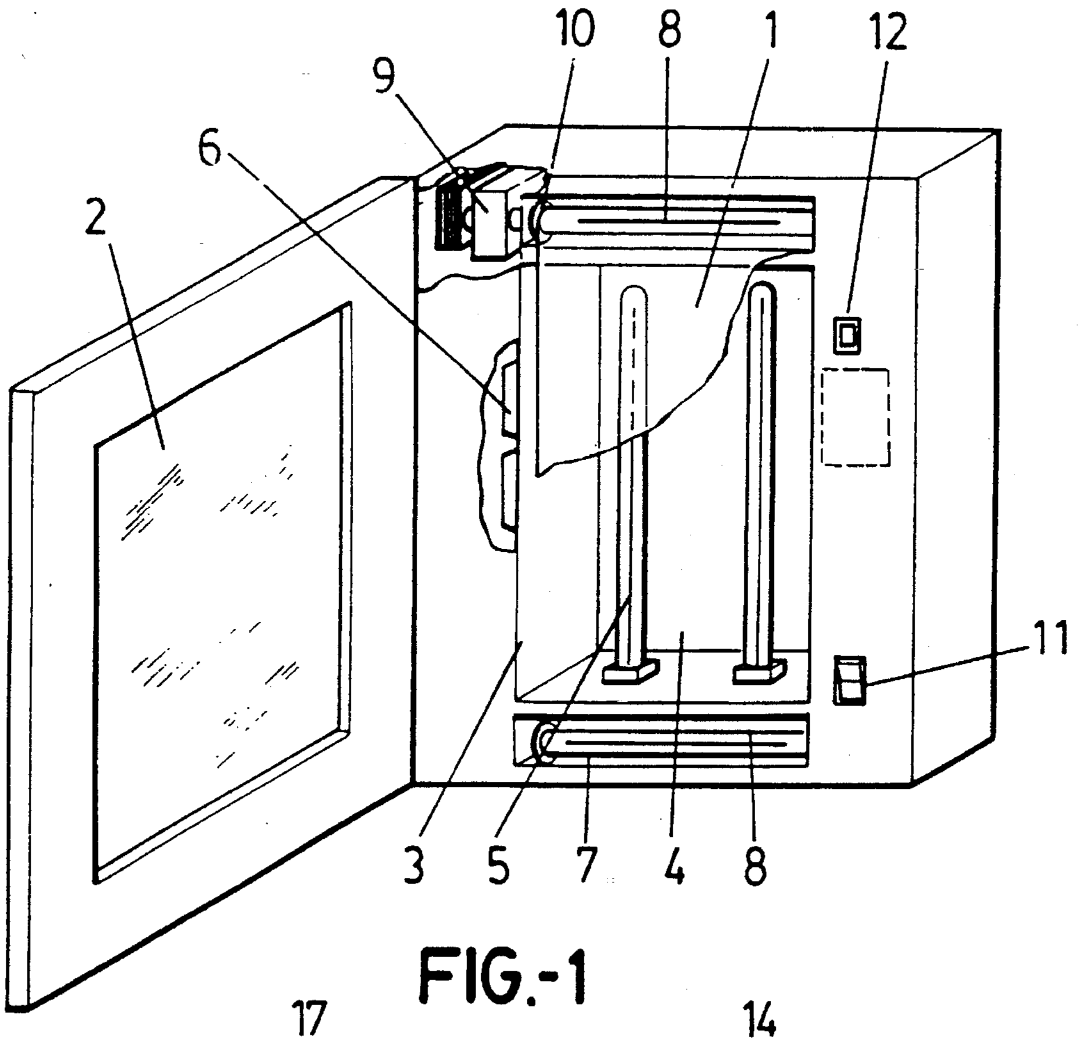
FIG. 1 represents a partial section perspective view of the projector, showing its main components.
Figure 2:
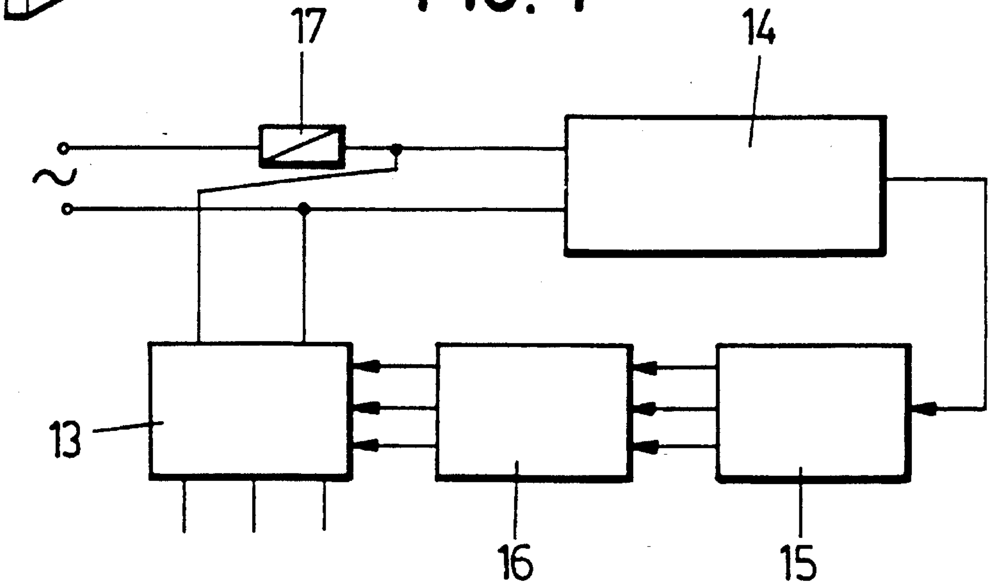
FIG. 2, shows the block diagram of the electronic set which controls the system.

FIG. 2 is a block diagram of the electronic set which controls movement of the strip and exhibition time, lights switching on and off, and in order to do so it has an exciter -13- linked to the motor and light system and a control unit for the power system -14-, linked through a logical control unit -15- to the aforementioned exciter -13- through some interface circuits -16-, and it also has a set of the safety and protection devices required -17-.

Having described this invention, the following claims are put forward as a new and original invention:

1. A continuous slide projector comprising:

a projector set having:

a light box having a front frame with an opening, a rear wall, side walls and a reflective screen positioned at the rear wall;

a mirror pivotally attached to the front frame of the light box, said mirror having a reflective front surface and a transparent rear surface such that two optical paths result wherein light striking the front of the mirror is reflected away from the mirror and light striking the rear of the mirror passes through the mirror;

a first light source placed within the box and positioned between the reflective screen and the mirror;

an electronic starter connected to and for energizing the first light source;

a second light source attached to the box above the mirror such that a person situated in front of the projector, upon energizing the second light source, will produce an illuminated reflection of himself in the mirror;

a slide strip consisting of a transparent film having at least one image printed thereon; and a drive mechanism positioned within the light box between the first light source and mirror, said drive mechanism having a frame comprising a body having two ends, two spools and two drive means, each drive means attached to a separate one of the spools, with one of said spools being attached at each end of the frame and having the slide strip coaxially rolled thereon such that when the spools are rotated the slide strip moves in unison with the spools and said image intersects light emanating from said first source thereby said image is projected onto the transparent rear of the mirror and propagates through the mirror such that the projected image may be viewed by a person observing the front of the mirror.

2. The continuous slide projector of claim 1 further comprising control means for interruptably enabling both drive means such that the person may energize the first light source through an electronic starter and interruptably enable both drive means through the control means so as to project said images onto the rear of the mirror in an interrupted manner.

3. The continuous slide projector of claim 1 further comprising control means for continuously enabling both drive means such that a person may energize the first light source through the electronic starter and continuously enable both drive means through the control means so as to project said images onto the rear of the mirror in a continuous manner.

* * * * *